United States Patent
Choi et al.

(10) Patent No.: US 10,826,382 B2
(45) Date of Patent: Nov. 3, 2020

(54) ELECTRONIC APPARATUS AND CONTROL METHOD THEREOF

(71) Applicant: Samsung Electronics Co., Ltd., Suwon-si (KR)

(72) Inventors: Shinwook Choi, Suwon-si (KR); Jeongil Kang, Suwon-si (KR); Moonyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/456,263

(22) Filed: Jun. 28, 2019

(65) Prior Publication Data

US 2020/0021183 A1    Jan. 16, 2020

(30) Foreign Application Priority Data

Jul. 16, 2018   (KR) .................. 10-2018-0082388

(51) Int. Cl.
*H02M 1/32*   (2007.01)
*H01R 24/60*  (2011.01)
(Continued)

(52) U.S. Cl.
CPC .............. *H02M 1/32* (2013.01); *H01R 24/60* (2013.01); *H02M 1/4208* (2013.01);
(Continued)

(58) Field of Classification Search
CPC ........ H02M 1/32; H02M 1/42; H02M 1/4208; H02M 1/4241; H02M 7/043;
(Continued)

(56) References Cited

U.S. PATENT DOCUMENTS 7,876,583 B2 *   1/2011   Polivka ............. H02M 3/33523
                                                         363/21.14
8,564,983 B2 *  10/2013   Ueno ................. H02M 3/33507
                                                             363/49
(Continued)

FOREIGN PATENT DOCUMENTS

CN          205489518 U       8/2016
JP          2013-223280      10/2013
(Continued)

OTHER PUBLICATIONS

Search Report and Written Opinion dated Nov. 13, 2019 in counterpart International Patent Application No. PCT/KR2019/008534.
(Continued)

*Primary Examiner* — Matthew V Nguyen
(74) *Attorney, Agent, or Firm* — Nixon & Vanderhye P.C.

(57) ABSTRACT

Disclosed is an electronic apparatus including a connector configured to connect the electronic device to an external apparatus; and a power circuit configured to supply power to the connected external apparatus, the power circuit including: a transformer configured to output an output voltage by varying a level of an input voltage; a switching unit comprising a switch configured to perform switching operation for the transformer; a controller configured to control the switching unit to match a level of the output voltage with the external apparatus; and an auxiliary power circuit including an auxiliary winding, and configured to supply power to the controller based on a voltage induced in the auxiliary winding by the output voltage and to decrease the number of turns of the auxiliary winding based on the output voltage having a level greater than or equal to a predetermined value.

18 Claims, 13 Drawing Sheets

(51) Int. Cl.
   *H02M 1/42* (2007.01)
   *H02M 7/04* (2006.01)
   *H02M 7/21* (2006.01)
(52) U.S. Cl.
   CPC ............ *H02M 7/043* (2013.01); *H02M 7/21* (2013.01); *H02M 2001/327* (2013.01)
(58) Field of Classification Search
   CPC .... H02M 7/1555; H02M 7/1557; H02M 7/21; H02M 7/217; H02M 2001/327; H01R 24/00; H01R 24/60
   See application file for complete search history.

(56) References Cited

U.S. PATENT DOCUMENTS

| | | | |
|---|---|---|---|
| 9,490,714 B1* | 11/2016 | Nishijima | ......... H02M 3/33507 |
| 2013/0300384 A1* | 11/2013 | Wang | ................ H02M 3/33523 323/271 |
| 2015/0162773 A1 | 6/2015 | Wang et al. | |
| 2015/0249393 A1 | 9/2015 | Zhang et al. | |
| 2016/0226384 A1 | 8/2016 | Nishijima | |
| 2016/0301314 A1* | 10/2016 | Polivka | ............. H02M 3/33507 |
| 2017/0093289 A1 | 3/2017 | Yang | |
| 2018/0183339 A1 | 6/2018 | Radic et al. | |
| 2019/0214900 A1* | 7/2019 | Ueno | ....................... H02M 1/08 |

FOREIGN PATENT DOCUMENTS

| | | |
|---|---|---|
| KR | 2000-0028436 | 5/2000 |
| KR | 10-2016-0093713 | 8/2016 |

OTHER PUBLICATIONS

Extended Search Report dated Nov. 29, 2019 in counterpart European Patent Application No. 19184652.6.

* cited by examiner

FIG. 6

(IN UNITS OF:V)

| $V_{CC}$ | $V_{LDO}$ CONSUMPTION | $V_{CC2}$ | $V_{out}$ |
|---|---|---|---|
| 13 | 0 | 13 | 5 |
| 13 | 10 | 23 | 9 |
| 13 | 26 | 39 | 15 |
| 13 | 39 | 52 | 20 |

FIG. 10

| $V_{CC}$ | $V_{LDO}$ CONSUMPTION | $V_{CC2}$ | $V_{P2}$ | $V_{P3}$ | $V_{out}$ (Ns) |
|---|---|---|---|---|---|
| 13 | 0 | 13 | 13 | 7 | 5 |
| 13 | 10 | 23 | 23 | 12 | 9 |
| 13 | 7 | 20 | - | 20 | 15 |
| 13 | 13 | 26 | - | 26 | 20 |

(IN UNITS OF:V)

$V_{out}$ = 5, 9: LOW VOLTAGE
$V_{out}$ = 15, 20: HIGH VOLTAGE

ELECTRONIC APPARATUS AND CONTROL METHOD THEREOF

CROSS-REFERENCE TO RELATED APPLICATION

The application is based on and claims priority under 35 U.S.C. § 119 to Korean Patent Application No. 10-2018-0082388 filed on Jul. 16, 2018 in the Korean Intellectual Property Office, the disclosure of which is incorporated by reference herein in its entirety.

BACKGROUND

Field

The present disclosure relates generally to an electronic apparatus and a control method thereof, and for example, to an electronic apparatus supplying power to an external apparatus and a control method thereof.

Description of Related Art

An electronic apparatus is being increasingly used in in supplying power to an external apparatus. For example, a TV, a monitor or the like display apparatus has been gradually improved in functions for convenience, and thus more and more required to have functions of connecting with and supplying power to various external products.

To deliver power from the electronic apparatus to the external apparatus, an insulation type direct current (DC)/DC converter, e.g., a flyback converter may be employed.

In the flyback converter, it is possible, using an auxiliary winding, to provide an operation voltage to a controller, which controls a switching unit, without separate external power.

Meanwhile, a standard of universal serial bus power delivery (hereinafter, referred to as 'USB PD') is highly utilized because it defines specifications not only for data transmission but also for power delivery to an external device connected through a USB terminal up to 100 W. For example, power of DC 5~20V delivered based on the USB PD may be supplied in stepwise levels of 5V, 9V, 15V, and 20V.

However, when various output voltages are required for the output terminal like those of the USB PD, a problem arises in that a voltage applied to the auxiliary winding is also varied due to the variation of the output voltage.

In order to maintain the operation voltage provided to the controller regardless of the variation of the applied voltage, a part for allowing the operation voltage to be constant may be used. However, as the variation of the applied voltage is large, a burden of the part increases.

An example problem is severe heat generation.

SUMMARY

An example aspect of the disclosure provides an electronic apparatus capable of mitigating variation in internal voltage of a power circuit even though an output voltage required for an external apparatus is varied.

According to an example embodiment, an electronic apparatus is provided, the electronic apparatus including: a connector configured to connect the electronic apparatus to an external apparatus; and a power circuit configured to supply power to the connected external apparatus, the power circuit including: a transformer configured to output an output voltage by varying a level of an input voltage; a switching unit comprising a switch configured to perform switching operation for the transformer; a controller configured to control the switching unit to match a level of the output voltage with the external apparatus; and an auxiliary power circuit including an auxiliary winding, the auxiliary power circuitry configured to supply power to the controller based on a voltage induced in the auxiliary winding by the output voltage and to decrease the number of turns of the auxiliary winding based on the output voltage having a level greater than or equal to a predetermined value.

The auxiliary power circuit may include a constant voltage output unit configured to receive the induced voltage of the auxiliary winding and supply a voltage having a level previously set corresponding to the controller.

The auxiliary winding may include a first auxiliary winding and a second auxiliary winding connected in series, and the auxiliary power circuit may selectively operate the first auxiliary winding or the second auxiliary winding based on the level of the output voltage.

The first auxiliary winding and the second auxiliary winding may each have a different number of turns.

The auxiliary power circuit may include a first switch configured to selectively operate based on whether the level of the output voltage is not less than a predetermined value, and a second switch configured to selectively operate the first auxiliary winding or the second auxiliary winding based on operation of the first switch.

The first switch may include a photocoupler.

The photocoupler may include a light emitting unit including light emitting circuitry directly connected the output voltage, and a light receiving unit including light receiving circuitry directly connected to the second switch.

The auxiliary power circuit may include a first switch configured to selectively operate based on the induced voltage of the first auxiliary winding having a level greater than or equal to a predetermined value, and a second switch configured to selectively operate the second auxiliary winding based on operation of the first switch.

The connector may include a first line configured to supply power, and a second line configured to transmit and receive data.

The controller may be configured to control the level of the output voltage based on information received through the second line and related to a level of power to be supplied to the external apparatus.

The level of the output voltage may include a first level and a second level greater than the first level, and the auxiliary power circuit may decrease the number of turns of the auxiliary winding based on the supply of the output voltage having the second voltage.

The electronic apparatus may include a display.

According to an example embodiment, a method of controlling an electronic apparatus including a connector configured to connect the electronic apparatus to an external apparatus, and a power circuit configured to supply power to the connected external apparatus, the method including: receiving, through the connector, level information of power to be supplied to the external apparatus; controlling a level of an output voltage of the power circuit based on the received level information; decreasing the number of turns of an auxiliary winding of the power circuit based on the level of the output voltage; and supplying power to a controller of the power circuit based on a voltage induced in the auxiliary winding by the output voltage.

The decreasing the number of turns of the auxiliary winding may include decreasing the number of turns of the auxiliary winding based on the output voltage having a level greater than or equal to a predetermined value.

The auxiliary winding may include a first auxiliary winding and a second auxiliary winding connected in series, and the decreasing the number of turns of the auxiliary winding may include making the first auxiliary winding or the second auxiliary winding selectively operate based on the level of the output voltage.

The power circuit may include a first switch configured to selectively operate based on the level of the output voltage being greater than or equal to a predetermined value, and a second switch configured to selectively operate the first auxiliary winding or the second auxiliary winding based on operation of the first switch, and decreasing the number of turns of the auxiliary winding may include selectively operating the first auxiliary winding or the second auxiliary winding based on operation of the first switch and the second switch.

BRIEF DESCRIPTION OF THE DRAWINGS

The above and other aspects, features and advantages of the present disclosure will become apparent and more readily appreciated from the following detailed description, taken in conjunction with the accompanying drawings, in which:

FIG. 6 is a diagram illustrating example voltage consumption of a constant voltage output unit according to an output voltage according to an embodiment of the disclosure;

FIG. 10 is a diagram illustrating example effects of an electronic apparatus according to an embodiment of the disclosure.

DETAILED DESCRIPTION

Figure 1:
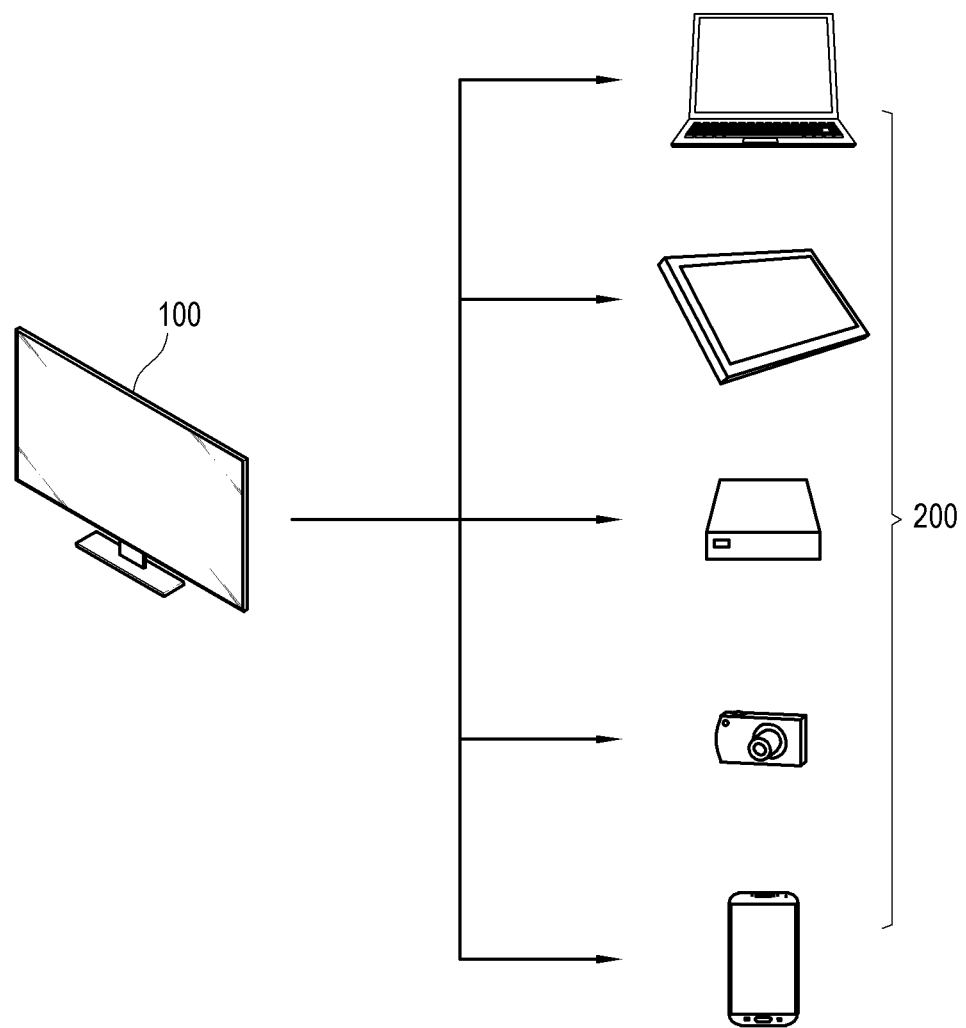
FIG. 1 is a diagram illustrating an example electronic apparatus and external apparatuses to which power from the electronic apparatus is supplied according to an embodiment of the disclosure.

Below, various example embodiments will be described in greater detail with reference to accompanying drawings. In the drawings, like numerals or symbols may refer to like elements, and the size of each element may be exaggerated for clarity and convenience of description. However, the configurations and functions illustrated in the following example embodiments are not to be understood as limiting the present disclosure and the key configurations and functions. In the disclosure, details about publicly known functions or features may be omitted where they may obscure the description or the gist of the present disclosure.

In the following example embodiments, terms 'first', 'second', etc. are simply used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software, firmware or combination thereof, and be modularized into at least one processor. Further, in the following example embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer, for example, and without limitation, to a dedicated processor (e.g. an embedded processor) for performing the corresponding operations, a generic-purpose processor (e.g. a central processing unit (CPU) or an application processor) for performing the corresponding operations by executing one or more software programs stored in a memory device, or the like.

FIG. 1 is a diagram illustrating an example electronic apparatus according to an embodiment of the disclosure.

The electronic apparatus 100 according to an embodiment of the disclosure may, for example, and without limitation, be a TV, a monitor, or the like display apparatus. However, the electronic apparatus of the disclosure is not limited to the display apparatus. The electronic apparatus of the disclosure may include any apparatus as long as it can supply power to the external apparatus, and its display function is not essential.

The electronic apparatus 100 according to an embodiment of the disclosure may supply power to an external apparatus 200. The external apparatus 200 to which power from the electronic apparatus 100 is supplied may, for example, and without limitation, include a notebook computer, a tablet computer, a disk drive, a digital camera, a smartphone, etc., but is not be limited thereto. Further, there are no limits to even a level of power needed for the external apparatus 200.

Figure 2:
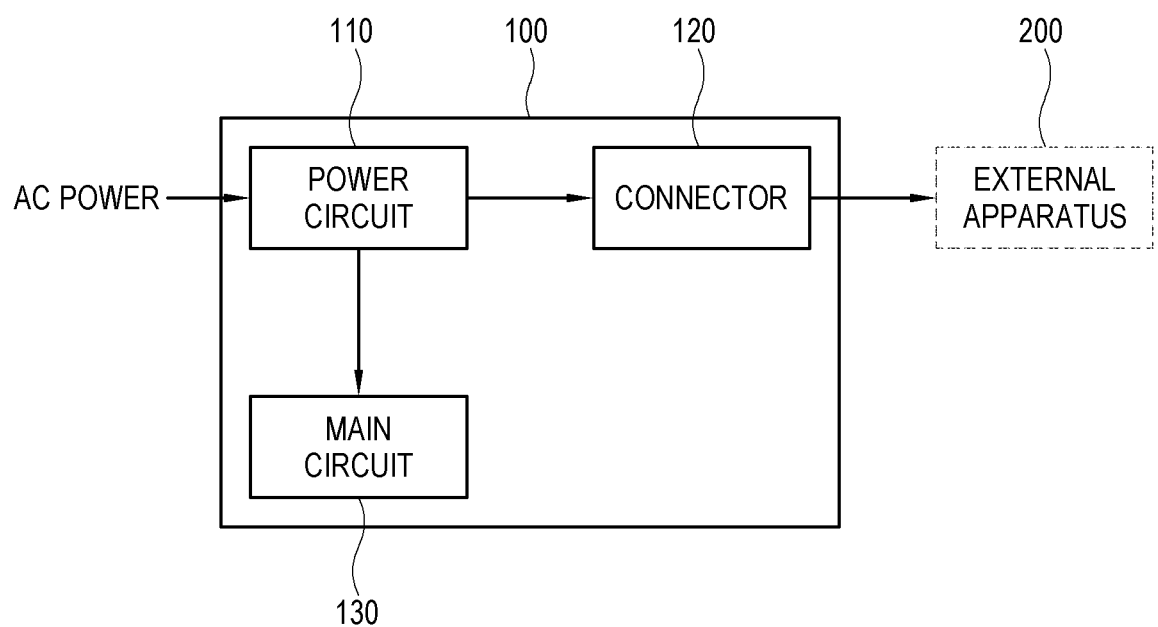
FIG. 2 is a block diagram illustrating an example electronic apparatus according to an embodiment of the disclosure.

FIG. 2 is a block diagram illustrating an example electronic apparatus according to an embodiment of the disclosure.

The electronic apparatus 100 according to an embodiment of the disclosure includes a power circuit 110, a connector 120, and a main circuit 130. However, the configuration of the electronic apparatus 100 illustrated in FIG. 2 is merely an example, and the electronic apparatus according to an embodiment of the disclosure may have another configuration. In other words, the electronic apparatus according to an embodiment of the disclosure may include other elements in addition to the elements illustrated in FIG. 2, or may exclude some elements illustrated in FIG. 2.

The power circuit 110 supplies power to at least one among the elements of the electronic apparatus 100. When the power circuit 110 connects with the external apparatus 200 through the connector 120, the power circuit 110 supplies power to the connected external apparatus 200.

The power circuit 110 converts received external alternating current (AC) power (or input power into direct current (DC) power), and regulates the converted DC power to have a predetermined level, thereby providing the regulated power to the elements of the electronic apparatus 100.

The power circuit 110 may for example, and without limitation, include a switching mode power supply (SMPS). For example, the power circuit 110 may be based on a flyback converter circuit.

The power circuit 110 may, for example, and without limitation, further include a rectifier configured to rectify the input AC power, a power factor corrector configured to correct power factor of the rectified power, a resonator configured to output a voltage by resonating with a voltage received from the power factor corrector, a converter configured to deliver power of a primary side output from the resonator to a secondary side, and/or a smoother configured to smooth the power of the secondary side and supply the smoothed power as output power of a power source to an image board.

The connector 120 connects the electronic apparatus 100 and the external apparatus 200. The connector 120 may, for example, and without limitation, be provided according to universal serial bus (USB), USB power delivery (PD) or the like standards, but not limited to these standards. The connector 120 may have any standards or configurations as long as it can connect with the external apparatus 200.

The main circuit 130 performs general operations of the electronic apparatus 100. For example, when the electronic apparatus 100 is a display apparatus, the main circuit 130 may be configured to make an image signal from an external image source be subjected to a preset image processing process, and may include, for example, and without limitation, an image processor configured to process an image signal, a display configured to display an image based on an image signal, a communicator configured to communicate with the outside, a processor configured to control a storage, in which various pieces of data are stored, and the display apparatus, etc. When the main circuit 130 includes a display, the display may display an image processed by the electronic apparatus 100. The display may for example be various display types such as, for example, and without limitation, liquid crystal, plasma, a light emitting diode (LED), an organic light emitting diode (OLED), a surface-conduction electron-emitter, a carbon nano-tube, nano-crystal, etc. without limitations. When the type of the display 105 is the liquid crystal, the display may include a liquid crystal display (LCD) panel, a backlight unit for emitting light to the LCD panel, a panel driver for driving the LCD panel, etc. The display may be a self-emissive OLED panel without the backlight unit.

Figure 3:
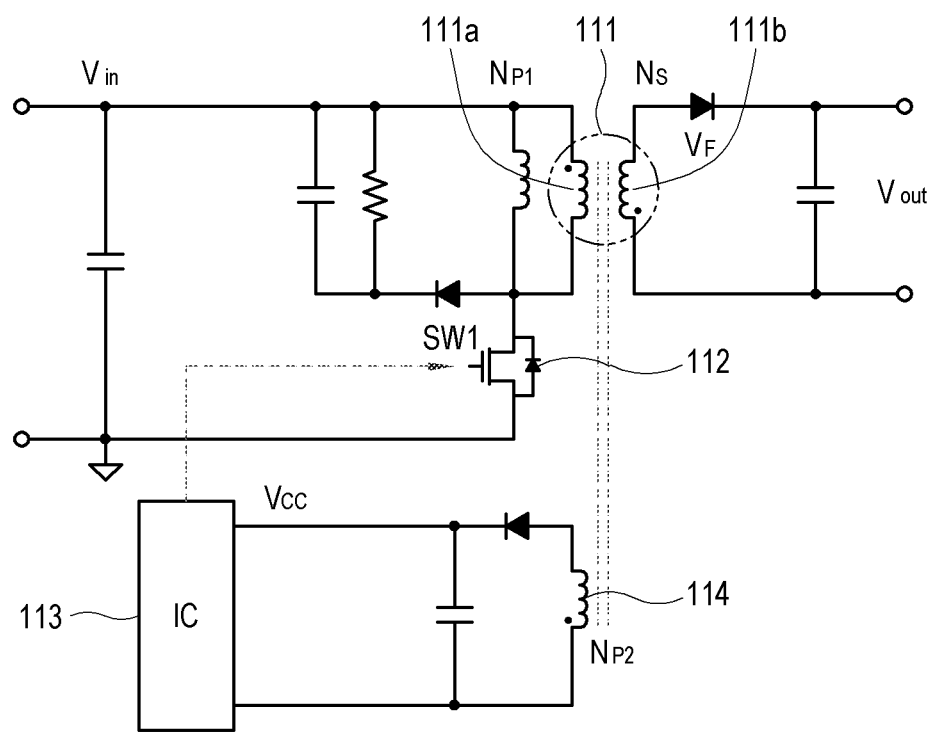
FIG. 3 is a circuit diagram illustrating an example power circuit capable of autonomously supplying power according to an embodiment of the disclosure.

FIG. 3 is a circuit diagram illustrating an example power circuit capable of autonomously supplying power according to an embodiment of the disclosure.

A power circuit 110 of FIG. 3 includes a transformer 111, a switching unit (e.g., including a switch) 112, a controller (e.g., including processing circuitry) 113, and an auxiliary winding 114.

The transformer 111 receives an input voltage from the power circuit 110, and outputs a voltage changed in level from the input voltage. The transformer 111 may include a primary winding 111a and a secondary winding 111b. The primary winding 111a may refer, for example, to a winding wire to which the input voltage is applied. The secondary winding 111b may refer, for example, to a winding wire having a predetermined turn ratio to the primary winding 111a and inducing voltage along with the primary winding 111a.

The switching unit 112 may include various switches and performs switching operation for the transformer 111. The switching operation of the switching unit 112 may be made in response to a predetermined frequency. The switching unit 112 may, for example, and without limitation, be a high-capacity switching device selected considering the maximum load condition of the main circuit 130.

The controller 113 may include various processing/control circuitry and controls the switching unit 112 so that the level of the output voltage matches the external apparatus 200. The controller 113 may, for example, and without limitation, be a control integrated circuit (IC) in which circuit devices are integrated.

The auxiliary winding 114 may refer, for example, to a winding wire having a predetermined turn ratio to the secondary winding and inducing voltage along with the secondary winding.

With this configuration, the power circuit 110 may operate as follows. When the input voltage is applied to the primary winding 111a, voltage is induced in the secondary winding 111b based on the turn ratio between the primary winding 111a and the secondary winding 111b, and the level of the output voltage induced in the secondary winding 111b is adjusted as the switching unit (e.g., switch) 112 is turned on/off under control of the controller 113. Further, voltage induced in the auxiliary winding 114 based on the turn ratio between the secondary winding 111b and the auxiliary winding 114 is supplied to the controller 113. When the auxiliary winding 114 is used, it is possible to autonomously supply power to the power circuit 110 without any separate external power for the controller 113.

Figure 4:
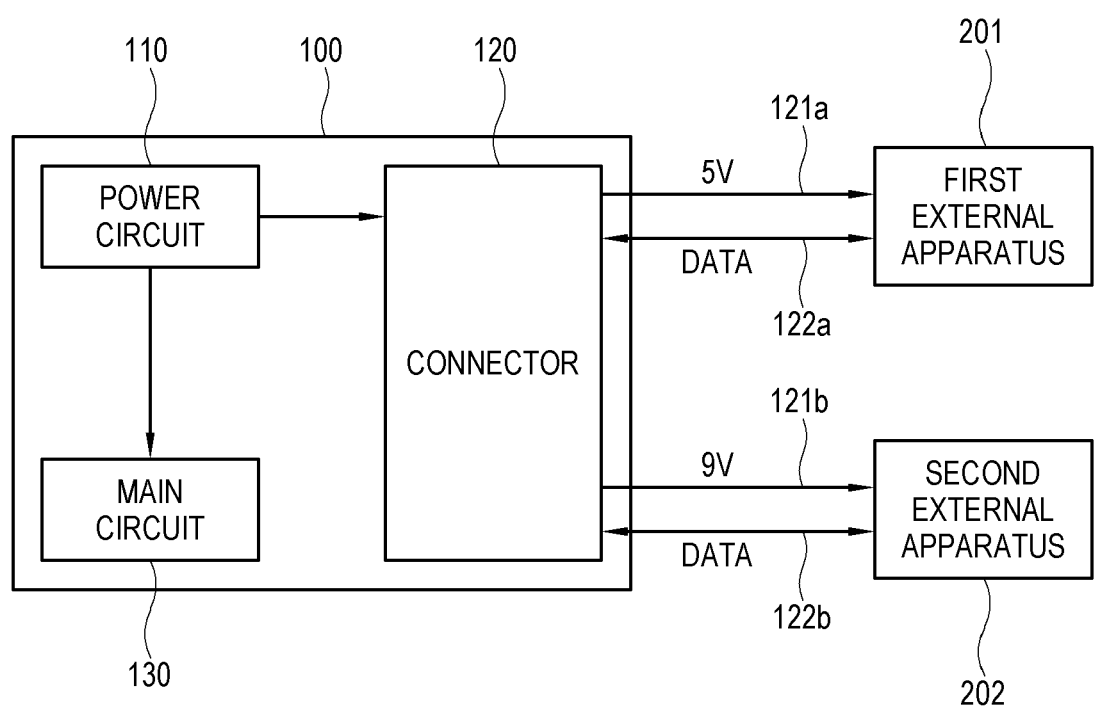
FIG. 4 is a block diagram illustrating a relationship between an example electronic apparatus and an external apparatus according to an embodiment of the disclosure.

FIG. 4 is a block diagram illustrating an example relationship between an electronic apparatus and an external apparatus according to an embodiment of the disclosure.

The connector 120 of the electronic apparatus 100 according to an embodiment of the disclosure may be based on the USB PD. However, the connector 120 of the disclosure is not limited to this embodiment, but may include any connector as long as it can provide an output voltage to the external apparatus 200, for example, it can provide a variable output voltage to the external apparatus 200. For convenience of description, the connector 120 based on the USB PD will be described below by way of non-limiting example.

When the connector 120 of the disclosure is based on the USB PD, DC 5~20V from the electronic apparatus 100 can be supplied to the external apparatus 200 in stepwise levels of, for example, and without limitation, 5V, 9V, 15V, and 20V, and therefore such a single connector 120 is enough to supply the power to various external apparatuses 200 different in voltage. For example, as shown in FIG. 4, power of 5V may be supplied to a first external apparatus 201, while power of 9V may be supplied to a second external apparatus 202. Thus, it is possible to supply different output voltages to the external apparatuses.

Further, when the connector 120 of the disclosure is based on the USB PD, the connector 120 may include a first line 121 (e.g., 121a and 121b) for supplying power, and a second line 122 (e.g., 122a and 122b) for supplying data. Therefore, the connector 120 of the disclosure are used in both supplying power to and exchanging data with the external apparatus 200. The connector 120 may, for example, include a plurality of first lines 121a and 121b, and a plurality of second lines 122a and 122b.

As a method of supplying power of adaptive necessary voltages to the external apparatuses, the controller 113 of the power circuit 110 may control the level of the output voltage based on information about a power level necessary for the external apparatus 200, received through the second line 122 of the connector 120. For example, when the external apparatus 200 is connected to the connector 120, the controller 113 identifies a level of an output voltage adaptive to the external apparatus 200 by exchanging data with the external apparatus 200, and controls the switching unit 112 (see, e.g., FIG. 3) to supply the output voltage having the identified level adaptive to the external apparatus 200 by adjusting the level of the output voltage.

As described above, when the level of the output voltage is varied depending on the external apparatus 200, the voltage induced in the auxiliary winding 114 and supplied to the controller 113 is also varied. In this example, the voltage supplied to the controller 113 may be below or above an operation voltage range for the controller 113, and therefore the controller 113 may not operate normally.

To address this problem, the power circuit may include a constant voltage output unit.

Figure 5:
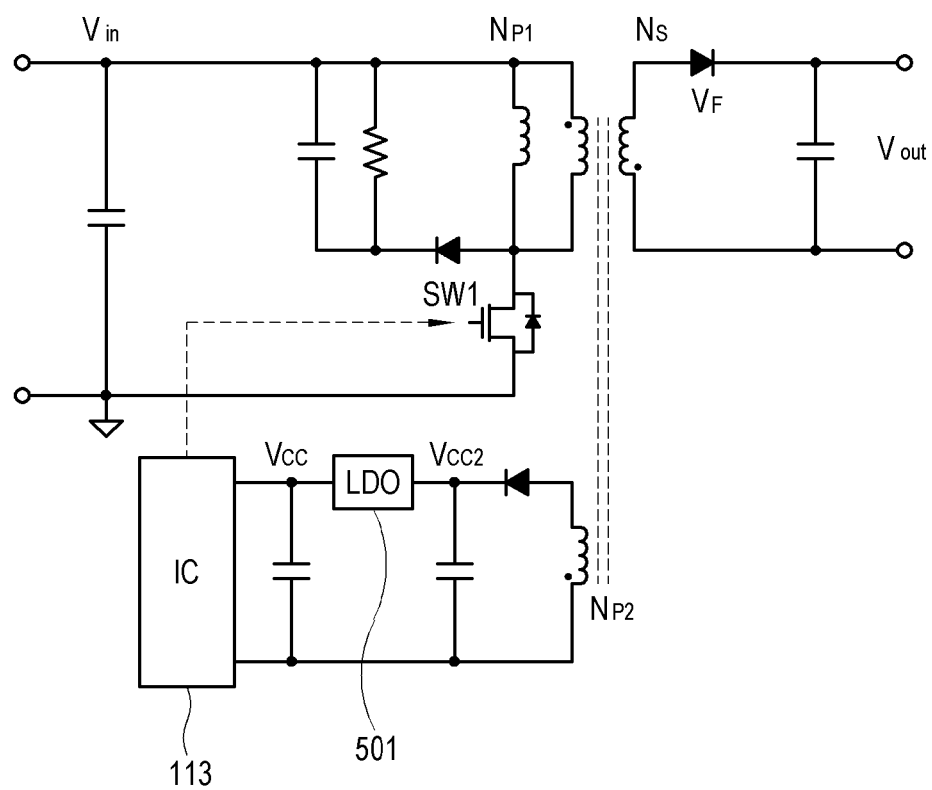
FIG. 5 is a circuit diagram illustrating an example power circuit including a constant voltage output unit according to an embodiment of the disclosure.

FIG. 5 is a diagram illustrating an example of a power circuit including the constant voltage output unit according to an embodiment of the disclosure. For convenience of description, it will be described that a low dropout (LDO) circuit is used as the constant voltage output unit. However, the constant voltage output unit is not limited to the LDO, but may include any means as long as it can output a constant voltage even though the input voltage is varied.

As shown in FIG. 5, when the LDO 501 is provided between the auxiliary winding 114 and the controller 113 of the power circuit, a constant voltage is supplied to the controller 113 even though the USB PD-based connector 120 of the electronic apparatus 100 makes the output voltage of the power circuit 110 be variable within the range of 5~20V and thus the minimum level of the output voltage be about four times different from the maximum level.

However, the LDO 501 consumes higher voltage and thus generates more heat as the difference between the minimum level and the maximum level of the output voltage become greater.

In this regard, detailed descriptions will be made with reference to FIG. 6.

FIG. 6 is a diagram illustrating example voltage consumption of a constant voltage output unit according to an output voltage. In other words, FIG. 6 is a table in which the levels of the voltage consumed in the LDO 501 are tabulated matching the output voltages of 5V, 9V, 15V and 20V of the power circuit 110.

An induced voltage $V_{cc2}$ of the auxiliary winding 114 is varied depending on a turn ratio between the secondary winding 111b and the auxiliary winding 114. FIG. 6 shows an example of when a turn ratio of 1:2.6 is given between the secondary winding 111b and the auxiliary winding 114. Therefore, when the power circuit 110 provides an output voltage $V_{out}$ of 5V, the induced voltage $V_{cc2}$ of the auxiliary winding 114 is 13V. However, the turn ratio between the secondary winding 111b and the auxiliary winding 114 is not limited to this example.

Further, there are no limits to the output voltage $V_{cc}$ output from the LDO 501. Therefore, the output voltage $V_{cc}$ output from the LDO 501 may be designed and set by selecting the LDO 501 in accordance with a desired output voltage or by the like method. FIG. 6 shows an example where the output voltage output from the LDO 501 is designed to be 13V. In this case, the voltage $V_{LDO}$ consumed in the LDO 501 is 0V because the input voltage input to the LDO 501, e.g., the induced voltage $V_{cc2}$ of the auxiliary winding 114 is 13V and the output voltage $V_{cc}$ output from the LDO 501 is 13V. This case is shown in the first row in the table of FIG. 6.

With the same circuit configuration, when the power circuit 110 provides an output voltage $V_{out}$ of 9V, the induced voltage $V_{cc2}$ of the auxiliary winding 114 is 23V. In this example, the voltage $V_{LDO}$ consumed in the LDO 501 is 10V because the output voltage $V_{cc}$ output from the LDO 501 is 13V. This example is shown in the second row in the table of FIG. 6.

With the same circuit configuration, when the power circuit 110 provides an output voltage $V_{out}$ of 15V, the induced voltage $V_{cc2}$ of the auxiliary winding 114 is 39V. In this example, the voltage $V_{LDO}$ consumed in the LDO 501 is 26V because the output voltage $V_{cc}$ output from the LDO 501 is 13V. This example is shown in the third row in the table of FIG. 6.

With the same circuit configuration, when the power circuit 110 provides an output voltage $V_{out}$ of 20V, the induced voltage $V_{cc2}$ of the auxiliary winding 114 is 52V. In this example, the voltage $V_{LDO}$ consumed in the LDO 501 is 39V because the output voltage $V_{cc}$ output from the LDO 501 is 13V. This example is shown in the fourth row in the table of FIG. 6.

The output voltage $V_{out}$ of the power circuit 110 is varied into 5V, 9V, 15V or 20V, the voltage consumed in the LDO 501 is also varied within a range of 0~39V. In other words, a problem arises in that the LDO 501 consumes a wider range of voltage and thus generates more heat as the difference between the minimum level and the maximum level of the output voltage becomes greater.

To address such a problem, an embodiment of the disclosure will be described in greater detail below with reference to FIGS. 7, 8 and 9.

Figure 7:
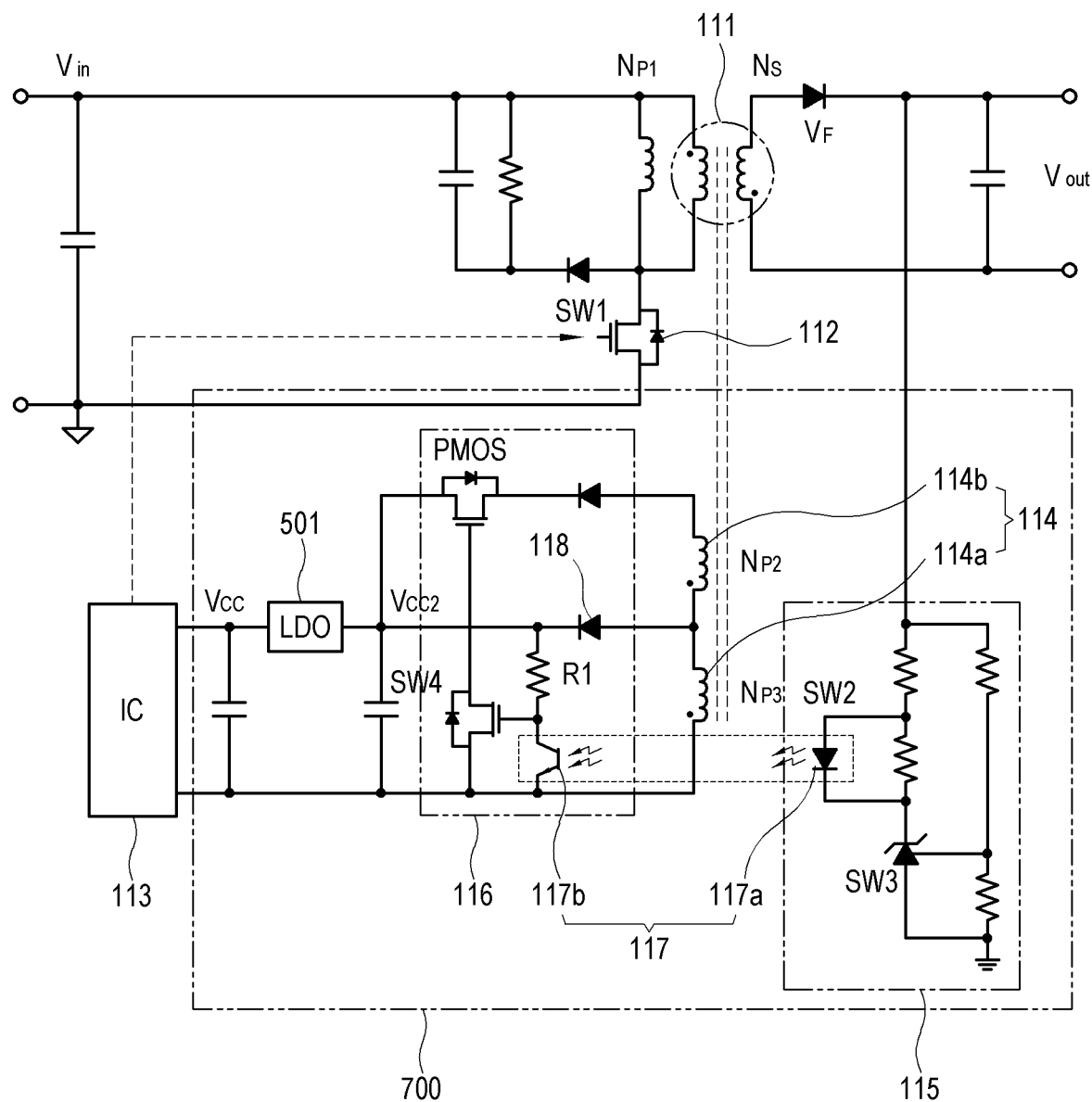
FIGS. 7, 8 and 9 are circuit diagrams illustrating an example power circuit of an electronic apparatus according to an embodiment of the disclosure.
Figure 8:
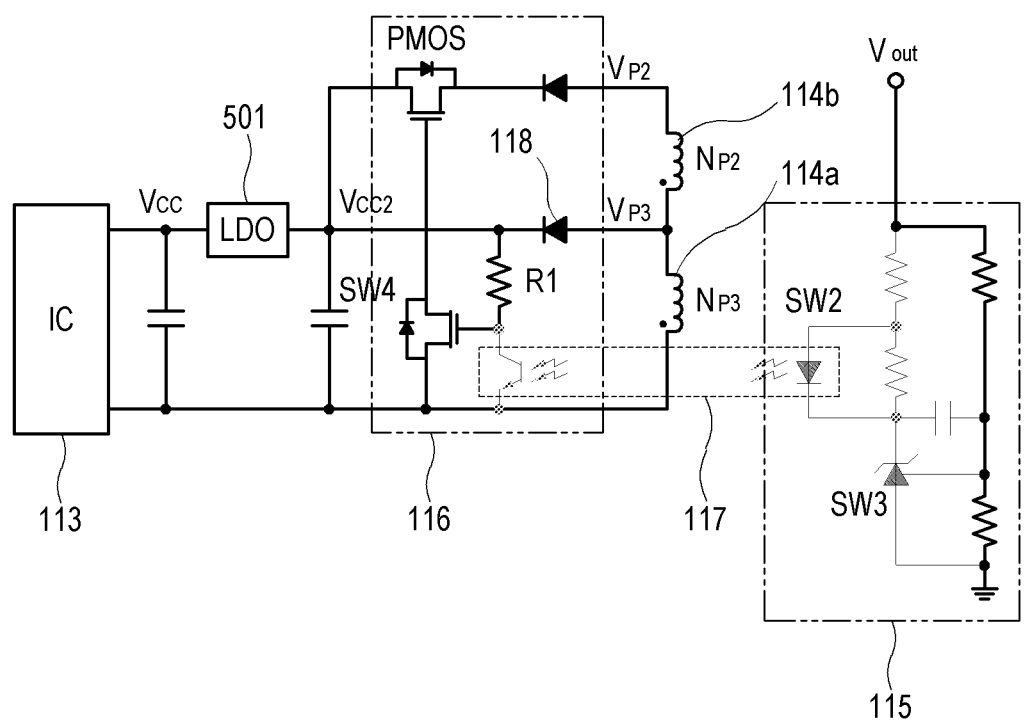
Figure 9:
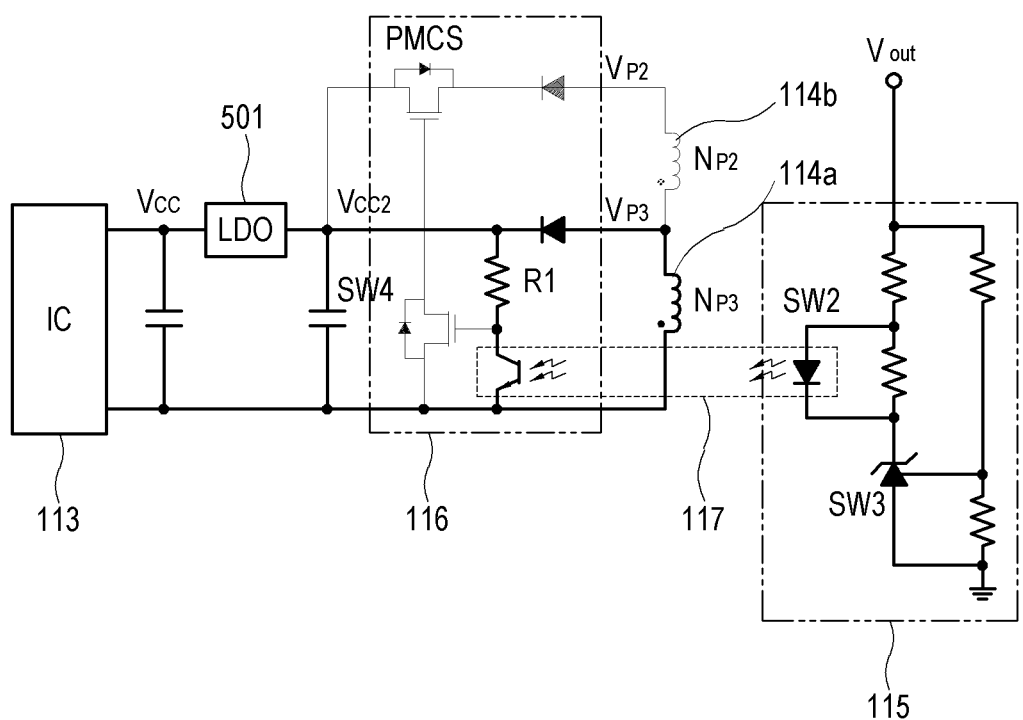

FIGS. 7, 8 and 9 are circuit diagrams illustrating an example power circuit of an electronic apparatus according to an embodiment of the disclosure.

The power circuit 110 of the electronic apparatus 100 according to an embodiment of the disclosure includes transformer 111 configured to output an output voltage by varying a level of an input voltage, the switching unit (e.g., including a switch) 112 configured to perform switching operation for the transformer 111, a controller (e.g., including processing/controlling circuitry) 113 configured to control the switching unit 112 to match a level of the output voltage with the external apparatus 200, and an auxiliary power circuit 700. The auxiliary power circuit 700 includes the auxiliary winding 114, supplies power to the controller 113 based on the voltage induced in the auxiliary winding 114 by the output voltage, and decreases the number of turns for the auxiliary winding 114 when the level of the output voltage is greater than or equal to a predetermined value.

Thus, when the level of the output voltage is greater than or equal to a predetermined value, voltage induced in the auxiliary winding and voltage supplied to the controller become lower as the number of turns for the auxiliary winding decreases, thereby restricting the variation in the level of the voltage supplied to the controller of the power circuit within a predetermined range even though the level of the output voltage is largely varied.

In the electronic apparatus 100 according to an embodiment of the disclosure, the auxiliary power circuit 700 of the power circuit 110 may include a constant voltage output unit 501 configured to receive the induced voltage of the auxiliary winding 114 and supply a voltage having a preset matching level to the controller 113.

Thus, not only the variation in the level of the voltage supplied to the controller of the power circuit is restricted within a predetermined range, but also the level of the voltage supplied to the controller is maintained at a constant value.

To decrease the number of turns for the auxiliary winding 114 when the level of the output voltage is greater than a predetermined value, the auxiliary winding 114 of the power circuit 110 in the electronic apparatus 100 according to an embodiment of the disclosure may for example include a first auxiliary winding 114a and a second auxiliary winding 114b which are connected in series. In this example, the auxiliary power circuit 700 may selectively operate the first auxiliary winding 114a or the second auxiliary winding 114b based on the levels of the output voltage. The first auxiliary winding 114a and the second auxiliary winding 114b may be different in the number of turns from each other.

To selectively operate the first auxiliary winding 114a or the second auxiliary winding 114b based on the levels of the output voltage, the auxiliary power circuit 700 of the power circuit 110 in the electronic apparatus 100 according to an embodiment of the disclosure may for example include a first switch 115 configured to selectively operate according to the output voltage being greater than or equal to a predetermined value, and a second switch 116 configured to selectively operate the first auxiliary winding 114a or the second auxiliary winding 114b based on the operation of the first switch 115.

The first switch 115 may include, for example, a photocoupler 117. When the first switch 115 includes the photocoupler 117, the photocoupler 117 may for example include a light emitting unit (e.g., including a diode) 117a directly connected to the output voltage, and a light receiving unit (e.g., including light receiving circuitry) 117b directly connected to the second switch 116. However, the first switch 115 is not limited to this embodiment, but may include another element, such as, for example, and without limitation, a field effect transistor (FET), or the like, besides the photocoupler 117. It is the same for the second switch 116.

Thus, by selective operation of the first auxiliary winding or the second auxiliary winding according to the levels of the output voltage, that is, with a relatively simple configuration for making the auxiliary winding operate corresponding to the level of the output voltage, it is possible to restrict the variation in the level of the voltage supplied to the controller of the power circuit within a predetermined range even though the level of the output voltage is largely varied.

Below, the operation of the power circuit having the foregoing configuration in the electronic apparatus according to an embodiment of the disclosure will be described with reference to FIGS. 8 and 9.

FIG. 8 is a circuitry diagram illustrating an example power circuit in the electronic apparatus according to an embodiment of the disclosure when the output voltage of the power circuit is low, and FIG. 9 is a circuitry diagram illustrating an example power circuit in the electronic apparatus according to an embodiment of the disclosure when the output voltage of the power circuit is high.

In this embodiment, there are no specific references for identifying whether the output voltage is low or high. The reference for distinguishing between the low voltage and the high voltage is freely and technologically changeable as necessary by a method of changing the switch of the power circuit or its peripheral configuration, or the like method. For convenience of description, it will be be described by way of non-limiting example below that the output voltages of 5V and 9V are set as the low voltages, and the output voltages of 15V and 20V are set as the high voltages. Further, for convenience of description, it will be described under a condition that the number of turns $N_{p3}$ of the first auxiliary winding is fewer than the number of turns $N_{p2}$ of the second auxiliary winding. However, the reference for distinguishing between the low voltage and the high voltage and the turn ratio between the first auxiliary winding and the first auxiliary winding are merely examples, and the disclosure is not limited to those in this embodiment.

FIG. 8 is a circuit diagram illustrating an example power circuit in the electronic apparatus according to an embodiment of the disclosure when the output voltage of the power circuit is the low voltage. In other words, FIG. 8 illustrates the operation of the power circuit 110 when the external apparatus 200 requiring a voltage of 5V or 9V is connected to the connector 120 of the electronic apparatus 100 according to an embodiment of the disclosure.

When AC power is input to the power circuit 110, the power is applied to the controller 113 via the primary winding 111a, the secondary winding 111b, and the auxiliary winding 114. In this case, the voltage required by the external apparatus 200 connected to the connector 120 is the low voltage, and does not turn on the first switch 115 because the required voltage does not reach a preset voltage for the first switch 115. In other words, FIGS. 8 and 9 illustrate an embodiment where the first switch 115 is provided to be turned on at 15V and 20V but turned off at 5V and 9V.

When the first switch 115 is not turned on, the photocoupler 117 included in the first switch 115 is also not turned on. In this case, an electric current induced by the first auxiliary winding 114a flows toward 'R1' and turns one of the second switches 116, e.g., 'SW4' on and the other one, e.g., 'PMOS' have the gate lowered down to the ground GND, thereby forming a flow where 'PMOS' is turned on and a voltage of $V_{p2}$ is applied to the LDO 501.

In this example, although the voltages of $V_{p3}$ and $V_{p2}$ are respectively induced in the first auxiliary winding 114a and the second auxiliary winding 114b, a higher voltage of $V_{p2}$ between the two voltages is applied as the input voltage $V_{cc2}$ to the LDO 501. Therefore, the higher voltage is applied to the cathode with respect to a diode 118, that is, a reverse voltage is applied to the diode 118. As a result, the first auxiliary winding 114a does not operate. In other words, when the level of the output voltage is low, the first auxiliary winding 114a having fewer turns between the first auxiliary winding 114a and the second auxiliary winding 114b does not operate but the second auxiliary winding 114b having more turns is selected to operate, so that the input voltage $V_{cc2}$ input to the LDO 501 can have a relatively high level even though the output voltage is the low voltage.

On the other hand, FIG. 9 is a circuit diagram illustrating an example power circuit in the electronic apparatus according to an embodiment of the disclosure when the output voltage of the power circuit is the high voltage. In other words, FIG. 9 illustrates the operation of the power circuit 110 when the external apparatus 200 requiring a voltage of 15V or 20V is connected to the connector 120 of the electronic apparatus 100 according to an embodiment of the disclosure.

When AC power is input to the power circuit 110, the power is applied to the controller 113 via the primary winding 111a, the secondary winding 111b, and the auxiliary winding 114. In this case, the voltage required by the external apparatus 200 connected to the connector 120 is the high voltage, and turns on the first switch 115 because the required voltage satisfies the preset voltage for the first switch 115.

When the first switch 115 is turned on, the photocoupler 117 included in the first switch 115 is also turned on. In this example, 'R1' at the second switch 116 is short-circuited to the ground GND, and thus one of the second switches 116, e.g., 'SW4' is turned off. When 'SW4' is turned off, 'PMOS' is turned off. As a result, the second auxiliary winding 114b does not operate, and only the first auxiliary winding 114a operates, thereby applying a voltage of $V_{p3}$ as '$V_{cc2}$'. In other words, when the level of the output voltage is high, the first auxiliary winding 114a having fewer turns between the first auxiliary winding 114a and the second auxiliary winding 114b is selected to operate but the second auxiliary winding 114b having more turns does not operate, so that the input voltage $V_{cc2}$ input to the LDO 501 can have a relatively low level even though the output voltage is the high voltage.

In other words, the power circuit 110 of the electronic apparatus 100 according to an embodiment of the disclosure induces the auxiliary winding 114 to have a high voltage by making the second auxiliary winding 114b having more turns operate when the output voltage of the power circuit 110 is the low voltage, but induces the auxiliary winding 114 to have a low voltage by making the first auxiliary winding 114a having fewer turns operate when the output voltage of the power circuit 110 is the high voltage.

Thus, it is possible to restrict the variation in the level of the voltage supplied to the controller of the power circuit within a predetermined range even though the level of the output voltage is largely varied.

FIG. 10 is a diagram illustrating example effects of an electronic apparatus according to an embodiment of the disclosure. For convenience, the description referring to FIG. 10 will be made on the assumption that a turn ratio between the secondary winding 111b and the second auxiliary winding 114b is 1:2.6 (i.e. $N_s:N_p2=1:2.6$) so that a voltage of 13V (i.e. $V_p2=13V$) can be induced in the second auxiliary winding 114b when the power circuit 110 has an output voltage $V_{out}$ of 5V, and a turn ratio between the secondary winding 111b and the first auxiliary winding 114a is 1:1.3 (i.e. $N_s:N_{p2}=1:1.3$) so that a voltage of 20V (i.e. $V_{p3}=20V$) can be induced in the first auxiliary winding 114a when the power circuit 110 has an output voltage $V_{out}$ of 15V. Further, descriptions will be made on the assumption that the LDO 501 is designed to output the output voltage of 13V. However, the turn ratios between the secondary winding 111b and the first auxiliary winding 114a and between the secondary winding 111b and the second auxiliary winding 114b are not limited to these assumptions. Further, the output voltage of the LDO 501 is not limited to this assumption.

When the power circuit 110 provides the output voltage $V_{out}$ of 5V, 7V is induced in the first auxiliary winding 114a (e.g., $V_p3=7V$) and 13V is induced in the second auxiliary winding 114b (e.g., $V_{p2}=13V$) according to the turn ratios between the secondary winding 111b and the first auxiliary winding 114a and between the secondary winding 111b and the second auxiliary winding 114b. Because the output voltage $V_{out}$ of 5V belongs to the low voltage, as described with reference to FIG. 8, the voltage induced in the first auxiliary winding 114a is not supplied to the LDO 501 due to the reverse voltage of the diode even though the voltages are induced in both the first auxiliary winding 114a and the second auxiliary winding 114b, and therefore the voltage $V_{cc2}$ substantively supplied to the LDO 501 corresponds to the voltage $V_{p2}$, e.g., 13V induced in the second auxiliary winding 114b. In this example, the LDO 501 outputs the same voltage as 13V, and therefore the voltage consumed in the LDO 501 is 0V. This example is shown in the first row in the table of FIG. 10.

When the power circuit 110 provides the output voltage $V_{out}$ of 9V, 12V is induced in the first auxiliary winding 114a (e.g., $V_{p3}=12V$) and 23V is induced in the second auxiliary winding 114b (e.g., $V_p2=23V$) according to the turn ratios between the secondary winding 111b and the first auxiliary winding 114a and between the secondary winding 111b and the second auxiliary winding 114b. Because the output voltage $V_{out}$ of 9V belongs to the low voltage, as described with reference to FIG. 8, the voltage induced in the first auxiliary winding 114a is not supplied to the LDO 501 due to the reverse voltage of the diode even though the voltages are induced in both the first auxiliary winding 114a and the second auxiliary winding 114b, and therefore the voltage $V_{cc2}$ substantively supplied to the LDO 501 corresponds to the voltage $V_{p2}$, i.e. 23V induced in the second auxiliary winding 114b. In this example, the LDO 501 outputs a voltage of 13V, and therefore the voltage consumed in the LDO 501 is 10V. This example is shown in the second row in the table of FIG. 10.

Meanwhile, when the power circuit 110 provides the output voltage $V_{out}$ of 15V, which belongs to the high voltage, as described with reference to FIG. 9, the first auxiliary winding 114a having fewer turns between the first auxiliary winding 114a and the second auxiliary winding 114b is selected to operate, and therefore the voltage $V_{cc2}$ supplied to the LDO 501 corresponds to the voltage $V_{p3}$ induced in the first auxiliary winding 114a, e.g., 20V. In this example, the LDO 501 outputs a voltage of 13V, and therefore the voltage consumed in the LDO 501 is 7V. This example is shown in the third row in the table of FIG. 10.

When the power circuit 110 provides the output voltage $V_{out}$ of 20V, which belongs to the high voltage, as described with reference to FIG. 9, the first auxiliary winding 114a having fewer turns between the first auxiliary winding 114a and the second auxiliary winding 114b is selected to operate, and therefore the voltage $V_{cc2}$ supplied to the LDO 501 corresponds to the voltage $V_{p3}$ induced in the first auxiliary winding 114a, e.g., 26V. In this example, the LDO 501 outputs a voltage of 13V, and therefore the voltage consumed in the LDO 501 is 13V. This example is shown in the fourth row in the table of FIG. 10.

In other words, the voltages consumed in the LDO 501 are 0V, 10V, 7V and 13V with regard to the output voltages of 5V, 9V, 13V and 20V, respectively. These results will be compared with those of FIG. 6 as follows. When the output voltage varies from 5V to 20V, FIG. 6 shows that the voltage consumed in the LDO 501 ranges from 0V to 39V. On the other hand, FIGS. 7, 8 and 9 according to an embodiment of the disclosure show that the voltage consumes in the LDO 501 ranges from 0V to 13V. In other words, it will be appreciated that the voltage Vcc2 input to the LDO 501 is reduced by ⅓ as compared with that of FIG. 6. Therefore, heat generation caused by voltage consumption in the LDO 501 is also decreased.

Below, another example embodiment of the disclosure will be described with reference to FIGS. 11, 12 and 13.

Figure 11:
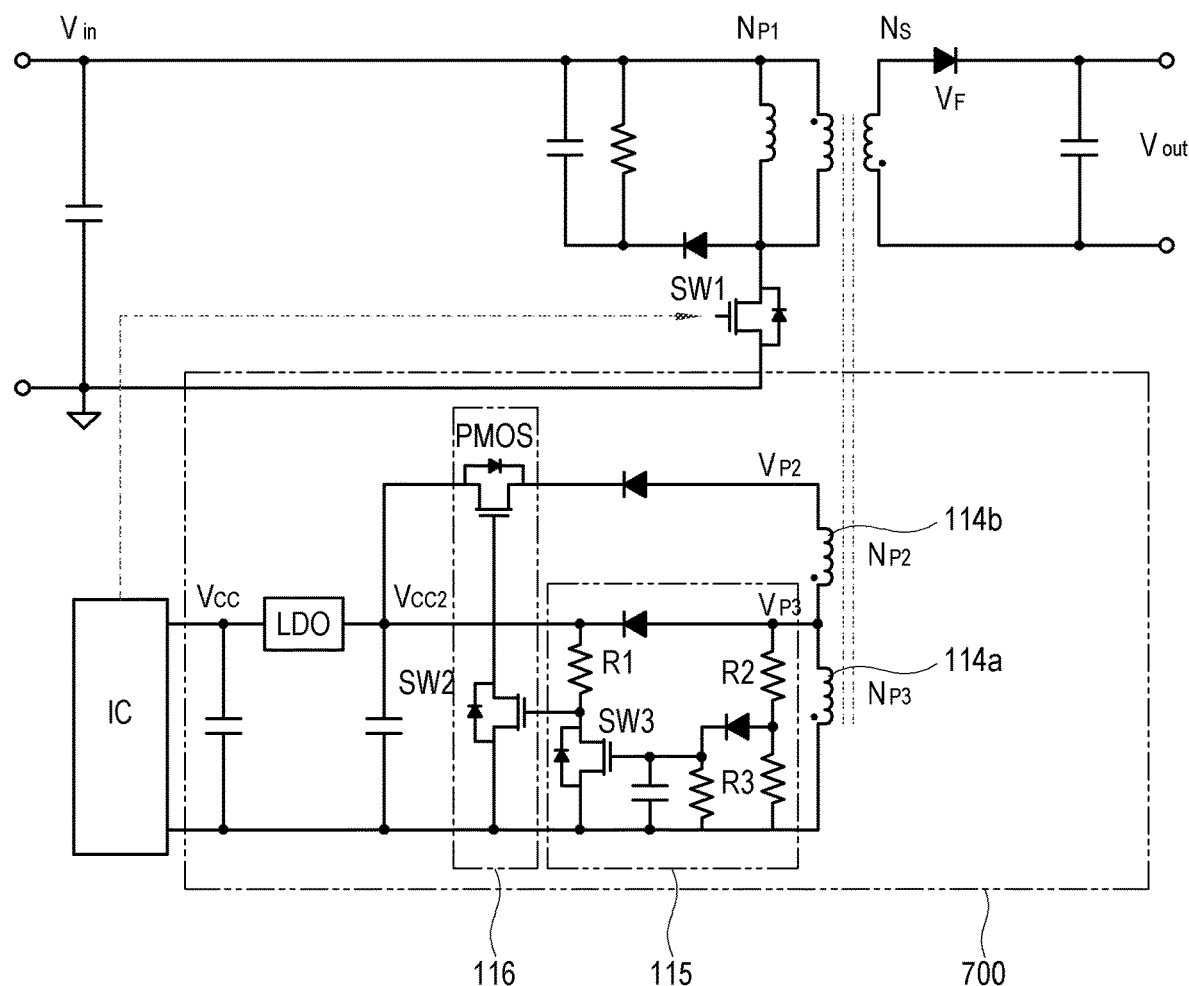
FIGS. 11, 12 and 13 are circuit diagrams illustrating an example power circuit of an electronic apparatus according to another embodiment of the disclosure.
Figure 12:
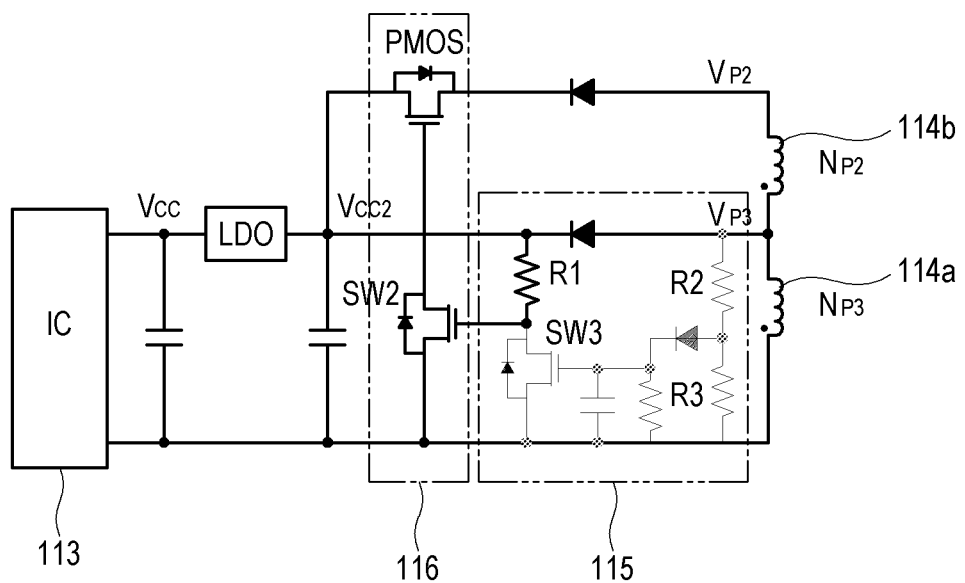
Figure 13:
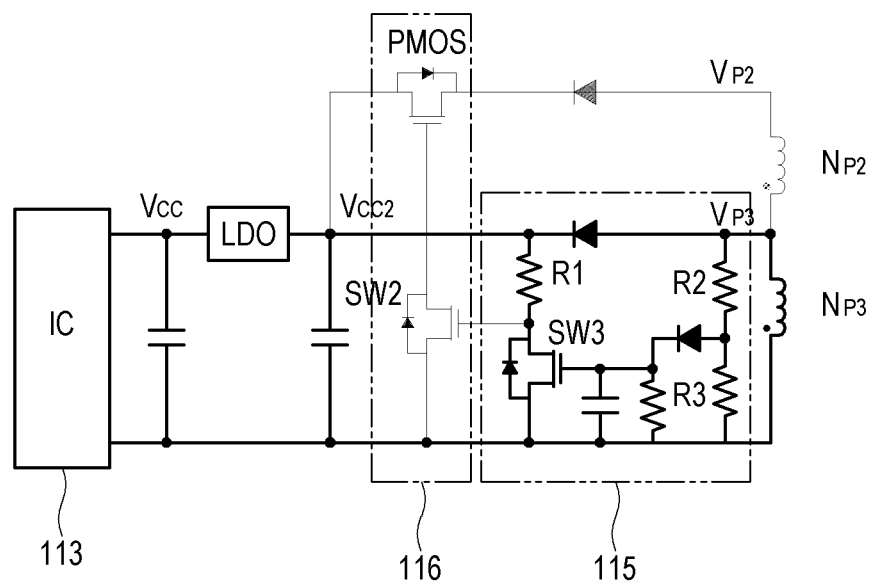

FIGS. 11, 12 and 13 are circuit diagrams illustrating an example power circuit of an electronic apparatus according to another embodiment of the disclosure.

Comparison between the foregoing embodiment and the following embodiment is as follows. Unlike the foregoing embodiment where the first switch 115 includes the photocoupler and the light emitting unit of the photocoupler is directly connected to the side of the output voltage, the first switch 115 according to this embodiment does not include the photocoupler, is not directly connected to the output voltage, and selectively operates based on the induced voltage of the first auxiliary winding 114a. In other words, the auxiliary power circuit 700 according to this embodiment of the disclosure includes the first switch 115 connected to the first auxiliary winding 114a and selectively operating according to the level of the voltage induced in the first auxiliary winding 114a. Further, the auxiliary power circuit 700 according to this embodiment of the disclosure includes the second switch 116 making the second auxiliary winding 114b selectively operate according to the operation of the first switch 115.

With this configuration, operation of the power circuit in the electronic apparatus according to this embodiment of the disclosure will be described in greater detail below with reference to FIGS. 12 and 13.

FIG. 12 is a circuit diagram illustrating an example power circuit in the electronic apparatus according to this embodiment of the disclosure when the output voltage of the power circuit is the low voltage.

When AC power is input to the power circuit 110, the power is applied to the controller 113 via the primary winding 111a, the secondary winding 111b, and the auxiliary winding 114. In this example, the voltage required by the external apparatus 200 connected to the connector 120 is the low voltage, and does not turn on the first switch 115, e.g., SW3, because the required voltage does not reach a preset voltage for the first switch 115. In this example, an electric current induced by the first auxiliary winding 114a flows toward 'R1' and turns one of the second switches 116, e.g., 'SW4' on and the other one, e.g., 'PMOS' have the gate lowered down to the ground GND, thereby forming a flow where 'PMOS' is turned on and a voltage of $V_{p2}$ is applied to the LDO 501. In other words, when the level of the output voltage is low, the first auxiliary winding 114a having fewer turns between the first auxiliary winding 114a and the second auxiliary winding 114b does not operate but the second auxiliary winding 114b having more turns is selected to operate, so that the input voltage $V_{cc2}$ input to the LDO 501 can have a relatively high level even though the output voltage is the low voltage.

On the other hand, FIG. 13 is a circuit diagram illustrating an example power circuit in the electronic apparatus according to this embodiment of the disclosure when the output voltage of the power circuit is the high voltage.

When AC power is input to the power circuit 110, the power is applied to the controller 113 via the primary winding 111a, the secondary winding 111b, and the auxiliary winding 114. In this example, the voltage required by the external apparatus 200 connected to the connector 120 is the high voltage, and turns on the first switch 115, e.g., SW3, because the required voltage satisfies the preset voltage for the first switch 115.

When the first switch 115 is turned on, 'R1' is short-circuited to the ground GND, and thus one of the second switches 116, e.g., 'SW2' is turned off. When 'SW2' is turned off, 'PMOS' is turned off. As a result, the second auxiliary winding 114b does not operate, and only the first auxiliary winding 114a operate, thereby applying a voltage of $V_{p3}$ as '$V_{cc2}$'. In other words, when the level of the output voltage is high, the first auxiliary winding 114a having fewer turns between the first auxiliary winding 114a and the second auxiliary winding 114b is selected to operate but the second auxiliary winding 114b having more turns does not operate, so that the input voltage $V_{cc2}$ input to the LDO 501 can have a relatively low level even though the output voltage is the high voltage.

In other words, the power circuit 110 of the electronic apparatus 100 according to an embodiment of the disclosure induces the auxiliary winding 114 to have a high voltage by making the second auxiliary winding 114b having more turns operate when the output voltage of the power circuit 110 is the low voltage, but induces the auxiliary winding 114 to have a low voltage by making the first auxiliary winding 114a having fewer turns operate when the output voltage of the power circuit 110 is the high voltage.

Thus, it is possible to restrict the variation in the level of the voltage supplied to the controller of the power circuit within a predetermined range even though the level of the output voltage is largely varied.

Further, the power circuit in the electronic apparatus according to the embodiments of the disclosure has an advantage that an additionally required area is not large as compared with that of the conventional power circuit.

As described above, according to the disclosure, it is possible to mitigate variation in internal voltage of a power circuit even though an output voltage required for an external apparatus is varied.

Thus, when the level of the output voltage is greater than or equal to a predetermined value, voltage induced in the auxiliary winding and voltage supplied to the controller become lower as the number of turns for the auxiliary winding decreases, thereby restricting the variation in the level of the voltage supplied to the controller of the power circuit within a predetermined range even though the level of the output voltage is largely varied.

Thus, not only the variation in the level of the voltage supplied to the controller of the power circuit is restricted within a predetermined range, but also the level of the voltage supplied to the controller is maintained at a constant value.

Thus, by selective operation of the first auxiliary winding or the second auxiliary winding according to the levels of the output voltage, that is, with a relatively simple configuration for making the auxiliary winding operate corresponding to the level of the output voltage, it is possible to restrict the variation in the level of the voltage supplied to the controller of the power circuit within a predetermined range even though the level of the output voltage is largely varied.

Thus, it is possible to restrict the variation in the level of the voltage supplied to the controller of the power circuit within a predetermined range even though the level of the output voltage is largely varied.

Thus, when the level of the output voltage is greater than or equal to a predetermined value, voltage induced in the auxiliary winding and voltage supplied to the controller become lower as the number of turns for the auxiliary winding decreases, thereby restricting the variation in the level of the voltage supplied to the controller of the power circuit within a predetermined range even though the level of the output voltage is largely varied.

Thus, by selective operation of the first auxiliary winding or the second auxiliary winding according to the levels of the output voltage, that is, with a relatively simple configuration for making the auxiliary winding operate corresponding to the level of the output voltage, it is possible to restrict the variation in the level of the voltage supplied to the controller of the power circuit within a predetermined range even though the level of the output voltage is largely varied.

Thus, it is possible to mitigate variation in internal voltage of a power circuit even though an output voltage required for an external apparatus is varied.

Although various example embodiments have been illustrated and described herein, it will be appreciated by those skilled in the art that changes may be made in these example embodiments without departing from the principles and spirit of the disclosure, the scope of which may be defined, for example, in the appended claims and their equivalents.

What is claimed is:

1. An electronic apparatus comprising:
   a connector configured to connect the electronic apparatus to an external apparatus; and
   a power circuit configured to supply power to the connected external apparatus,
   the power circuit comprising:
   a transformer configured to output an output voltage based on an input voltage;
   a controller configured to perform a control operation to match a level of the output voltage with the external apparatus; and
   an auxiliary power circuit configured to supply a voltage induced by the output voltage to the controller and to decrease the voltage supplied to the controller based on the output voltage having a level greater than or equal to a predetermined value.

2. The electronic apparatus according to claim 1, wherein the electronic apparatus comprises a display.

3. The electronic apparatus according to claim 1, wherein the auxiliary power circuit comprises an auxiliary winding, wherein the auxiliary power circuit is configured to decrease the number of turns of the auxiliary winding based on the output voltage having the level greater than or equal to the predetermined value.

4. The electronic apparatus according to claim 3, wherein the auxiliary power circuit comprises a constant voltage output unit comprising constant voltage output circuitry configured to receive the induced voltage of the auxiliary winding and to supply a voltage having a level corresponding to the controller.

5. The electronic apparatus according to claim 3, wherein
   the auxiliary winding comprises a first auxiliary winding and a second auxiliary winding, the first auxiliary winding and the second auxiliary winding being connected in series, and
   wherein the auxiliary power circuit is configured to selectively operate the first auxiliary winding or the second auxiliary winding based on the level of the output voltage.

6. The electronic apparatus according to claim 5, wherein the first auxiliary winding and the second auxiliary winding each have a different number of turns.

7. The electronic apparatus according to claim 5, wherein the auxiliary power circuit comprises a first switch configured to selectively operate based on the level of the output voltage being not less than a predetermined value, and a second switch configured to selectively operate the first auxiliary winding or the second auxiliary winding based on operation of the first switch.

8. The electronic apparatus according to claim 7, wherein the first switch comprises a photocoupler.

9. The electronic apparatus according to claim 8, wherein the photocoupler comprises a light emitting unit comprising light emitting circuitry directly connected the output voltage, and a light receiving unit comprising light receiving circuitry directly connected to the second switch.

10. The electronic apparatus according to claim 5, wherein the auxiliary power circuit comprises a first switch configured to selectively operate based on the induced voltage of the first auxiliary winding having a level greater than or equal to a predetermined value, and a second switch configured to selectively operate the second auxiliary winding based on operation of the first switch.

11. The electronic apparatus according to claim 3, wherein the connector comprises a first line configured to supply power, and a second line configured to transmit and/or receive data.

12. The electronic apparatus according to claim 11, wherein the controller is configured to control the level of the output voltage based on information received through the second line related to a level of power to be supplied to the external apparatus.

13. The electronic apparatus according to claim 12, wherein
   the level of the output voltage comprises a first level and a second level higher than the first level, and
   the auxiliary power circuit is configured to decrease the number of turns of the auxiliary winding based on the supply of the output voltage having the second voltage.

14. A method of controlling an electronic apparatus comprising a connector configured to connect the electronic apparatus to an external apparatus, and a power circuit configured to supply power to the connected external apparatus, the method comprising:
   receiving, through the connector, level information of power to be supplied to the external apparatus;
   performing a control operation to match a level of an output voltage of the power circuit based on the received level information;
   decreasing a voltage supplied to a controller based on the level of the output voltage; and
   supplying power to a controller of the power circuit based on the decreased voltage.

15. The method according to claim 14, wherein the power circuit comprises an auxiliary winding, the method further comprising decreasing the number of turns of the auxiliary winding based on the output voltage having the level greater than or equal to a predetermined value.

16. The method according to claim 15, wherein the decreasing the number of turns of the auxiliary winding comprises decreasing the number of turns of the auxiliary winding based on the output voltage having a level greater than or equal to a predetermined value.

17. The method according to claim 15, wherein
   the auxiliary winding comprises a first auxiliary winding and a second auxiliary winding, the first auxiliary winding and the second auxiliary winding being connected in series, and
   the decreasing the number of turns of the auxiliary winding comprises selectively operating the first auxiliary winding or the second auxiliary winding based on the level of the output voltage.

18. The method according to claim 17, wherein
   the power circuit comprises a first switch configured to selectively operate based on the level of the output voltage not being less than a predetermined value, and a second switch configured to selectively operate the first auxiliary winding or the second auxiliary winding based on operation of the first switch, and
   the decreasing the number of turns of the auxiliary winding comprises selectively operating the first auxiliary winding or the second auxiliary winding based on operation of the first switch and the second switch.

* * * * *